United States Patent [19]

Minamisawa et al.

[11] Patent Number: 4,727,132

[45] Date of Patent: Feb. 23, 1988

[54] METHOD OF CONTINUOUS MANUFACTURING OF POLYMERS OR COPOLYMERS OF TRIOXANE

[75] Inventors: Tsuyoshi Minamisawa, Mishima; Shuichi Chino, Fuji; Noboru Goto, Fujinomiya; Masaaki Nakamura, Fuji, all of Japan

[73] Assignee: Polyplastics Co., Ltd., Osaka, Japan

[21] Appl. No.: 861,031

[22] Filed: May 8, 1986

[30] Foreign Application Priority Data

May 13, 1985 [JP] Japan ................. 60-101029

[51] Int. Cl.$^4$ .............................. C08G 2/10
[52] U.S. Cl. .................... 528/230; 528/270
[58] Field of Search ................. 528/230, 270

[56] References Cited

U.S. PATENT DOCUMENTS

| | | | |
|---|---|---|---|
| 4,343,929 | 8/1982 | Sugio et al. | 528/241 |
| 4,390,684 | 6/1983 | Komazawa et al. | 528/230 |
| 4,431,794 | 2/1984 | Sadlowski et al. | 528/232 |
| 4,504,636 | 3/1985 | Tsunemi et al. | 526/67 |

*Primary Examiner*—Lucille M. Phynes
*Attorney, Agent, or Firm*—Burns, Doane, Swecker & Mathis

[57] ABSTRACT

A trioxane polymer is continuously produced with a continuous stirring-mixing apparatus. The apparatus includes two mutually parallel rotational shafts, a large number of paddles mounted on each rotational shaft and a barrel having an inside wall surface along the circular surface traced by the respective paddles, as they rotate. Thus, the barrel has a cross-section in the shape of two circles concentric with the two rotational shafts, which overlap each other. The apparatus is also provided with a temperature controlling jacket. In the operation of the apparatus, a material mixture of trioxane, catalyzer, other copolymerizable comonomers, as the case may be, and additives, is continuously fed in through a material supply port located at one end thereof, then, the material mixture is subjected to polymerization or copolymerization reaction, while being stirred by turning the aforementioned rotational shafts in an opposite direction to each other and, thereafter, the polymers or copolymers of trioxane are taken out as fine granules through a discharge port located at the other end thereof. The method is characterized in that at least one set of paddles of a sectional shape which meets a requirement that when a pair of paddles facing each other are turned in different directions around their rotational axes, the clearance between them shall be kept always as narrow as less than 3/100 of the barrel ID, are mounted on each shaft, adjoining each other, and the different direction turning is made in a state such that the clearance between the farthest part from the rotational axis of said paddle and the inside wall of the barrel are always maintained as narrow as less than 3/100 of the barrel ID.

4 Claims, 3 Drawing Figures

METHOD OF CONTINUOUS MANUFACTURING OF POLYMERS OR COPOLYMERS OF TRIOXANE

BACKGROUND OF THE INVENTION

1. Field of the Invention

The present invention relates to a method of continuous manufacturing of polymers or copolymers of trioxane. More particularly, it pertains to an improvement in the method of continuously manufacturing fine granular polymers from trioxane or by making copolymerization of trioxane as their main raw material with copolymerizable comonomers, using a polymerization reaction apparatus of the so-called continuous stirrer-mixer type having two parallel shafts which turn against each other, a large number of paddles mounted on each shaft and a barrel placed in proximity to the peripheries of said paddles.

2. Description of the Prior Art

Generally, two phenomena occur when polymerizable liquid monomers are polymerized in the presence of some appropriate polymerization catalyzer. In one, since the polymers formed are soluble in monomers, they form a viscous liquid, producing a highly viscous substance with proceeding polymerization. In the other, since the polymers are insoluble in the monomers, they undergo phase changes with proceeding polymerization from liquid, through the slurry state, to a perfect solid state of polymers which are deposited. This invention relates to the latter. The manufacture of polyacetal resins is a typical example of the continuous manufacture of solid polymers through such a polymerization reaction in the latter case.

The method of manufacturing polyacetal resins through homopolymerization of trioxane with cyclic ethers, such as ethylene oxide, etc., or cyclic formals, etc., using cationic active polymerization catalyzers such as boron trifluoride, phosphorus pentafluoride, tin tetrachloride and perchloric acid or their salts or complex salts, etc., is already well-known and is industrially practiced. In this polymerization or copolymerization reaction, the liquid monomers undergo so-called phase changes with proceeding polymerization from the liquid state of monomers through a slurry state for a short period to the solid state of polymers. Moreover, in the so-called block polymerization process in which almost no diluent is present, the reaction velocity is very high and, therefore, the phase changes are sudden and drastic, permitting no easy control. For example, if this polymerization or copolymerization reaction is performed in a stationary state, large lumpy, tough products will be obtained in a short period of time or almost instantaneously, resulting in great difficulty in their handling in the later grinding, cleaning and refining steps and the internal accumulation of polymerization heat makes temperature control almost impossible. This causes deterioration of the quality of the polymers and reduction in the polymerization conversion rate. At this juncture, numerous inventions have been proposed as methods for producing at high efficiency, fine granular polymer products which are relatively stabilized in quality by preventing the production of large block polymerization products, taking into account special aspects of the reaction. A basic idea common to those proposals involves the utilization of extruder-type polymerization reactors having a construction of two parallel shafts for stirring.

The idea of utilizing extruder-type reactors having a construction of two parallel shafts for the manufacture of polyacetal resins, were inspired by inventions based on use of extruders of two shaft screw-type of Patent Laid-Open Nos. 629/'72 and 42145/'72 and subsequently, another invention involving the utilization of a two shaft mixer composed of a combination of screws and elliptical plate shape paddles appeared in Patent Laid-Open No. 84890/'76. Numerous ingenious modifications and improvements have been made in the paddle shape, as shown by the successive proposals disclosed in Patent Laid-Open Nos. 86794/'78, 38313/'81 or 32619-21/'83. There is also available a type of reactor in which two parallel shafts turn in the same direction and another type of reactor in which they turn against each other (different direction turning). Both of these exhibit similar functions, but the former is characterized by an excellent self-cleaning property, while with the latter, an inventive proposal has been made, as in Patent Laid-Open No. 40520/'82, that shearing forces are developed in the desired altered directions corresponding to the phase changes. At present, most industrial production of polyacetal resin is carried out by manufacturing methods based on the above inventions.

Recently, the demand for polyacetal resin has increased and the quality of resin, especially where stability under heating is concerned, must be high. For these reasons, the present state of manufacturing is not fully satisfactory. Thus there is a demand to upgrade the polymer yield or polymerization conversion rate per unit apparatus and further, amelioration and improvement through increased efficiency of stabilization treatment. In the manufacture of polyacetal resin is made, using parallel two shaft rotary stirring type reactors based on the aforementioned proposals by applying various ingenious design to the shape of paddles mounted on the rotational shafts and their arrangements, relatively fine granular polymers will be obtained at high conversion rates in small scale apparatuses such as those for use in laboratories. However, with increasing sizes of the apparatus, satisfactory results have not always been achieved. As the yield of polymers with large grain sizes (e.g., coarse granules having sizes as large as or larger than a little finger), rather than fine granules, grows and the thickness of the polymer scale layer which is deposited on the internal wall surface of the apparatus increases, a situation develops in which a reduction in the polymerization conversion rate and the degradation of polymer quality due to decline in heat transfer efficiency are unavoidable to some extent.

When the bulk (co)polymerization of trioxane is performed at a very high reaction velocity and the formed polymers are insoluble in the material monomers, during the proceeding polymerization reaction, an abrupt change from slurry to solid state takes place, with the result being that the formed polymer particles tend to form large blocks followed by an increase in the temperature of the polymer due to internal storage of reaction heat, causing decomposition of polymers and a reduction in quality. If the polymers can be finely granulated at the polymerization step, the decomposition may be inhibited with the storage of heat of the polymerization reaction being averted. As a result, the polymerization yield is upgraded, the fall in the degree of polymerization is slight and the production rate of unstable part in copolymers is small. For this reason, aftersteps are greatly retrenched and the successful manufacture of trioxane (co)polymers with high quality is anticipated. However, the aforementioned inventions still involve various short comings.

In reactors with two parallel shafts which are turned in the same direction, no nipping-in between paddles takes place thereby resulting in insufficient effect in fine granulation and inadequate mixing of reaction reagents, and besides, need for use of large power.

In the reactors using lens-shaped paddles or pseudo-triangular paddles which have heretofore been in use, with their shafts turnable in different directions, the aforementioned difficulties may be eliminated. However, it is instantaneous only when the distance between paddles is at a minimum and in other times, they turn with large clearances, so that there exists great opportunity for polymers making ling into large blocks.

Furthermore, there has been a problem in that scale tended to be deposited on the inside wall surface of the barrel. For elimination of such a problem, paddles provided at their tips with sharp scrapers and which turn in the same direction were proposed (Patent Laid-Open Nos. 383131/'81 and 3262/'83). In these reactor types scraping beyond the clearance between the paddle tips and the inside wall was impossible because in large capacity reaction apparatuses, it was impossible to reduce this clearance to a predetermined value by way of machining or because the paddles and the inside wall surface and the two mated paddles come in contact with each other. Thus, this type of paddle offered only an unsatisfactory means of scale removal, but no other effective measure was available.

SUMMARY OF THE INVENTION

The present inventors have arrived at this invention as a result of studies on the fine granulation of polymers in the polymerization step, especially, on the shapes of the paddles.

Thus the present invention has as its substance a method of continuous manufacturing of polymers or copolymers of trioxane using a continuous stirring-mixing apparatus which includes two mutually parallel rotational shafts, a large number of paddles mounted on each rotational shaft, and a barrel having an internal wall surface along the circular circumference traced by the turning of respective pairs of paddles. The barrel has a cross-section in the shape of two circles coaxial with the two rotational shafts and the apparatus is provided with a jacket for temperature control on the outer periphery of the barrel. In the apparatus of the present invention, a polymerization or copolymerization reaction is carried out while stirring a material mixture of trioxane, catalyzer, other copolymerizable comonomers, as the case may be, and additives by turning the aforementioned rotational shafts in mutually different directions, with the material mixture being continuously fed through the material supply port at one end thereof, and the polymers or copolymers formed in the state of fine granules are taken out through the discharge port provided at the other end thereof. The method is characterized in that one set or two or more sets of paddles have a sectional shape which meets the requirement that the clearance between each set shall be always kept as narrow as less than 3/100 of the barrel inner diameter, when the set of paddles facing each other are turned in different directions, are mounted adjoiningly on each shaft, and the different direction turning is made with the clearance between the part farthest from the rotational axis of said paddle and the inside wall surface of the barrel always kept as narrow as less than 3/100 of the barrel inner diameter.

BRIEF DESCRIPTION OF THE DRAWINGS

In the following, the reaction apparatus used for carrying out the method of the present invention and particularly, the paddle by which the invention is, will be described in detail, with reference to the accompanying drawings:

In FIGS. 1, 2 and 3, reference numbers 1, 2, 3 and 4 represent a barrel, rotational shaft, paddle and jacket, respectively.

DETAILED DESCRIPTION OF THE INVENTION

Figure 1:
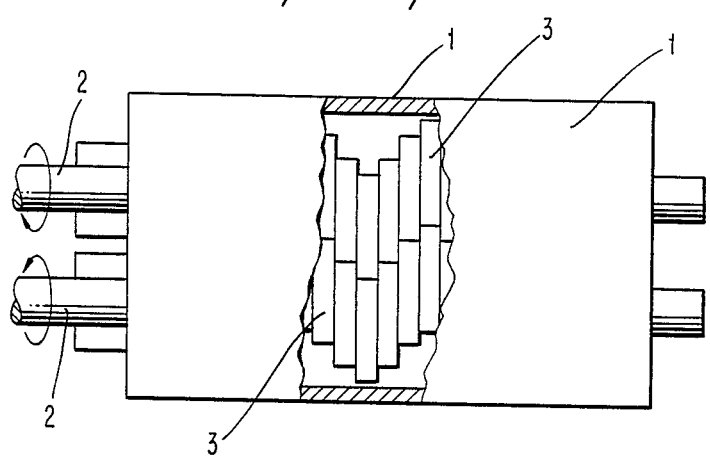
FIG. 1 is a schematic plan view of the reaction apparatus used in exercising the method of this invention, the broken part showing the positions of the shafts and the paddles. In this reaction apparatus, two rotational shafts 2, 2' are placed parallel to each other in barrel 1 having a cross-section in the shape of two circles overlapping each other. On these two rotational shafts, large numbers of paddles 3 are mounted.
Figure 2:
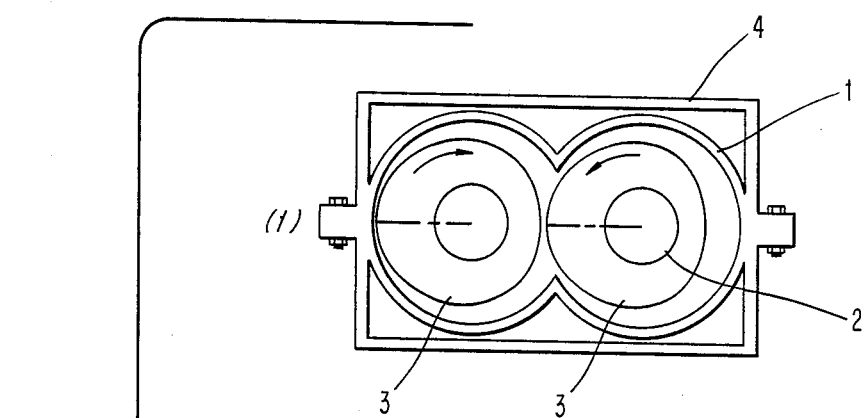
FIG. 2 is a schematic sectional view taken at a right angle to the axial direction, showing the changes of positions of respective paddles in (1), (2) and (3), when the one set of opposing paddles 3 make turns in different directions.

Thus, the paddle used according to this invention is characterized in that, as illustrated in FIG. 2, paddles having sections in the shape of a pseudo-circle or pseudo-ellipse are each mounted in a position offset from the center of axis of the circular inside wall surface of barrel 1. The apparatus is designed so that a substantially constant clearance t is kept between the inside wall surface of the barrel 1 and the farthest part from the rotational axis of the paddle 3 and that the paddles facing each other are allowed to turn in different directions with a substantially constant narrow clearance t' kept between them. A particular example of a paddle shape which satisfies such requirements is described with reference to FIGS. 3(1) and (2).

If it is assumed that distance from the axial center O of shaft 2 to the farthest part of paddle 3 is a, distance from the axial center O to nearest part of the paddle 3 is b, clearance between the barrel 1 and the farthest part of paddle 3 is t, the clearance between the paddles 3 is t', the internal radius of barrel 1 is r, and the distance between the axial centers O and O' is c, then, $a = r - t$ and $b = c - a - t'$.

Here, making $t = t'$ is expedient on a design basis. Assuming $t = t'$, $b = c - r$.

Then draw a straight line intersecting the line O-O' at a right angle and passing the axial center O and on said straight line, points C and D are determined as defined by $d = (a+b)/2 = \overline{CO} = \overline{DO}$.

Then draw a semi-ellipse $\overset{\frown}{CBD}$, with CD ($= a+b$) as its long diameter and $2 \times \overline{OB}(=2b)$ as its short diameter. Next, take a point F at a distance of $\overline{EF} = a+b$ from an arbitrary point E on this semi-ellipse along a line passing the axial center O. Then the shape of the other half $\overset{\frown}{CAD}$ will be determined by drawing the locus of the point F. In this way, the shape of the paddle section CADB is determined. This shape is symmetrical relative to the line AB and the clearance between the opposing paddles can be always kept at a substantially constant narrow value $t'=t$, when the two shafts are turned in different directions.

The paddle shape of this invention is, of course, not restricted to the design example above-mentioned, but may also include such shapes in which $t \neq t'$ or CBD is not exactly semi-elliptical.

Figure 3:
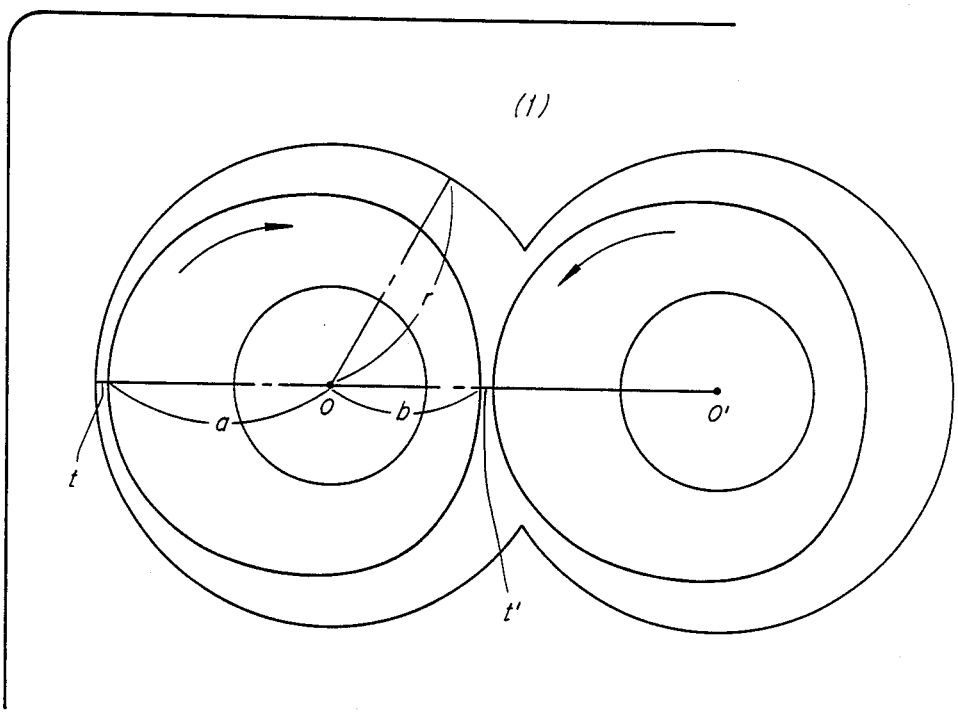
FIGS. 3(1) and (2) illustrate a design of the sectional shape of a paddle which satisfies the requirements of this invention.
Figure 3:
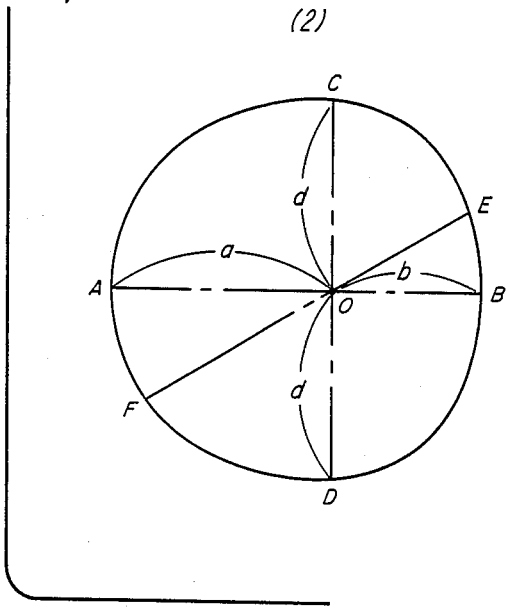

According to this invention, the clearance between the opposing paddles need not always be exactly constant, but the object of this invention will be always achieved, if the clearance is always kept smaller than 3/100 of the barrel ID and any deviations from the sectional shape of the paddle of FIG. 3 within this range are permissible. Anyway, the essential requirements are that the two shafts turn in mutually different directions while keeping within 3/100 of the barrel ID the clearance between opposing paddles and the clearance between the farthest part of the paddles and the inside wall of the barrel and the clearances should desirably not be in excess of 10 mm, even if the apparatus has been scaled up to whatever degree. The preferable size of the clearance should be less than 2/100 of the barrel ID and less than 5 mm.

The clearance between the side of a paddle and the side of another paddle adjacent thereto and facing it should be also less than 3/100 of the barrel ID and less than 10 mm, or preferably, less than 2/100 of the barrel ID and less than 5 mm.

The sectional shape of the paddle as abovementioned is basically satisfactory, but forming part or whole of its surface with serrations or gear teeth or undulations is also effective for fine granulation of polymer.

Furthermore, the paddle arrangement may be such that the neighboring paddles, as arbitrarily combined, will have an angle made by their long diameters of 180°, 90°, 45° or minus 45°, etc. By appropriately selecting the angle made by the neighboring paddles, proper effect of steering or leaving in stagnation of the content may be achieved and thereby its fine granulation may be made further effective through control of the filling rate in each part.

Other conditions to note in the design of the apparatus of this invention includes how to set the between-axis distance (c) relative to the barrel ID (2r), which should desirably be set in the range of between-axis distance (c) of $1.3r \leq c \leq 1.8r$.

If the reaction is carried out in the installed state of this reaction apparatus with such a gradient that the axis of the reaction apparatus is inclined at an angle of 10° or more to the horizontal, this is effective for preventing the phenomenon involving the pulsation of the flow of products from material charge-in to polymer discharge for the benefit of the stabilization of operation and equalization of polymer quality.

In carrying out the method of the present invention, a material mixture of trioxane, catalyzer, comonomers, as desired, and other additives, etc., is continuously supplied and the rotational shafts are turned in mutually different directions, so as to be turned inwardly at the top. The reaction temperature is controlled by means of a jacket provided outside the barrel or by passing some heating medium into the rotational shafts. The polymerization or copolymerization of trioxane is continuously performed.

In the case of copolymerization, well-known comonomers which are employed for copolymerization of trioxane, such as ethlene oxide, 1,3-dioxolane, dioxepane, 1,4-butanediol formal and other cyclic ethers or cyclic formals, etc., are usable.

As polymerization catalyzers, all well-known cationic polymerization catalyzers which are used for polymerization or copolymerization of trioxane are usable. Those most preferable includes boron trifluoride, coordination compound of boron trifluoride and ether, trifluoromethane sulfonic acid, etc.

Also, the addition of other appropriate molecular weight adjustors and other additives is permissible.

The heating medium temperature in the reaction apparatus jacket should be in the range of 60°–120° C., preferably 60°–110° C. In order to hold the internal temperature at an optimum value in correspondence with the heating condition at every part of the apparatus, it is also possible and desirable to locally alter the jacket temperature.

According to the present invention, it has become possible to control the substantial temperature of the reaction at a desirable level, based on the effects of this invention which are described hereunder, and it has been ascertained that improvements have been made over the conventional methods both in yield and quality.

Each opposing pair of paddles of this invention always maintain a small clearance between them and are turned in different directions, so as to be turned inwardly at the top, and moreover, they are designed to turn with a small clearance kept between the paddles and inside wall surface. As a result, it is nearly impossible to form polymers in large blocks by arranging paddles in such a way that the material mixture is treated by these paddles at the stage of its being in the state of slurry in the proceeding of the polymerization. Since it does grind large block polymers, this operation requires little.

The paddles of this invention also reduce the deposit of polymer scale on the inside wall surface of the barrel, thereby effecting an improvement in the self-cleaning property. The reason for this is that the sectional shape of the paddle of this invention has a large curvature. Therefore at the clearance between the paddles and the barrel, the contact area between the paddles and polymers is large and, accordingly, the contact resistance between the paddles and polymers is large a result, the scale adhering on the inside wall surface is scraped off through the polymers interposed between the paddles and the barrel. The polymer scale deposition preventing effect is very important for a system involving block polymerization such as this polymerization reaction system, in which the polymerization reaction is rapid and removal of reaction heat is difficult, because this effect will not only prevent decomposition by promoting heat removal from the polymer with enhanced heat transfer efficiency, thereby contributing to upgrading of quality, but it will lead to increase in polymerization rate.

As described above, the reaction apparatus used according to this invention prevents agglomeration of polymers at the polymerization stage and accumulation of polymerization heat inside the particles by their fine granulation. Furthermore, the apparatus, enhances the heat removal efficiency whole of the reaction system by preventing deposition of polymer scale on the inside wall surface thereby contributing to control of substantial polymer temperature. Consequently, decomposition of polymers is prevented, for the benefit of upgrading polymerization yield and polymerization degree and in copolymerization, the proportion of the unstable part is reduced to alleviate the burden in the later stabilizing step. Therefore, great effects will be attained in, for example, the improvement of quality.

In the following example, the present invention is described in connection with a specific embodiment thereof, but is not limited to that embodiment.

EXAMPLE 1

Continuous polymerization of trioxane was conducted, using a reaction apparatus with paddles having a cross-sectional shape given by the numerical representations of the dimentions indicated in FIG. 3(2)—a=73.5 (mm), b=49.5 (mm) and d=61.5 (mm). The length of the barrel of this apparatus is 150 mm, and its ID 150 mm, and on each of two shafts, 38 paddles are mounted. The offset disc shape paddles used according to this invention are arranged between the 18-th and the 28-th paddles, as counted from the material supply port side, with adjoining paddles all shifted by 90° in the turning direction. In other locations, lens shape paddles are used and paddles having forwarding and reversing mechanisms are interposed in appropriate positions. These paddles are installed such that a clearance of 3 mm is held from the inside wall surface of the barrel and that a clearance of also 3 mm is always maintained between opposing paddles.

From the material supply port, trioxane (100 part by weight/hr) containing 2.5% by weight of ethylene oxide and 50 ppm (on the basis of monomer) of boron trifluoride were fed and warm water at 60° C. was passed through the jacket. The paddles were turned at 36 rpm in different directions so as to be turned inward at the top and the stagnating time was approx. 2.3 min. The solid granular matter obtained through the discharge port contained 20% unreacted trioxane, the mean particle diameter Dpo determined by the particle size distribution in the Rosin-Rammlar chart being 1.6 mm, and the particle diameters larger than 5 meshes 3%.

The reaction was stopped by treating the system with a 0.1% aqueous solution of ethylamine, immediately after the polymers were discharged through the discharge port. The polymers after being filtered were cleaned with hot water and acetone, followed by drying. The proportion of the unstable part produced by the process of alkali hydrolysis of the polymers was 1.2%, and the melt-index value 5.0. Observation of the inside of the reaction apparatus after accomplishing the operation showed only thin local deposition of polymer scale on parts of the inside wall surface opposite the locations where the eccentric disc shape paddles of this invention are arranged.

COMPARATIVE EXAMPLE 1

The polymerization reaction was performed quite in the similar manner as in Example 1, using lens-shaped paddles (the clearance between the tips of the paddles and the inside wall surface was 3 mm) in place of the eccentric disc shape paddles of this invention used in Example 1. The stagnating time was 2.5 min, nearly the same as in case of the Example 1. The polymers obtained through the discharge port contained 28% trioxane, the mean particle diameter Dpo, as determined by the particle size distribution in the Rosin-Rammlar chart, was 2.4 mm and particle diameters giving larger than 5 meshes existed 12%. The proportion of the unstable part obtained by alkali hydrolysis of the polymers was 1.7% and the value of the melt index was 6.8. And after accomplishing the operation, observation of the inside of the reaction apparatus reveraled deposition of polymer scale approx. 3 mm thick nearly overall the inside wall surface.

The embodiments of the invention in which an exclusive property or privilege is claimed are defined as follows:

1. A method for the continuous manufacture of polymers or copolymers of trioxane using a continuous stirring-mixing apparatus including (i) two mutually parallel rotational shafts, (ii) multiple paddles mounted on each rotational shaft wherein for each paddle on one shaft there is a corresponding paddle on the other shaft, (iii) a barrel having an inside wall surface along the circular surface traced by the paddles during rotation, said barrel have a cross-section in the shape of two overlapping circles which are concentric with the two rotational shafts, and (iv) a temperature controlling jacket on the outer periphery of the barrel, wherein at least one pair of corresponding paddles has a sectional shape such that when the paddles of said at least one pair of paddles are rotated in different directions around their rotational axes the distance between them is maintained at less than about 3/100 of the inside diameter of the barrel during their rotation and the distance between the farthest portion of the paddle from the rotational axis of the paddle and the inside wall of the barrel is maintained at less than about 3/100 of the inside diameter of the barrel during their rotation, said process comprising continuously feeding a material mixture containing trioxane through a material supply port located at on end of the apparatus, subjecting the material mixture to a polymerization or copolymerization reaction while stirring the mixture by turning the rotational shafts in opposite directions to each other and, removing as fine granules, a polymer or copolymer of trioxane through a discharge port located at the other end of the apparatus.

2. A method according to claim 1, wherein said material mixture containing trioxane includes trioxane, a catalyst and other copolymerizable comonomers.

3. A method according to claim 1, wherein the paddles of said at least one pair of corresponding paddles have a sectional shape represented by drawing a semi-ellipse with the length (a+b) dissected at the center of the rotational axis of the paddle as its long diameter and 2×b as its short diameter and using the semi-ellipse and the shape drawn by the locus of points reached along a straight line from a point on the semi-ellipse through its axial center over a distance of a+b, wherein a is the farther distance from the axial center of the paddle to the circumferential edge of the paddle, and b is the shortest distance from the axial center of the paddle to the circumferential edge of the paddle.

4. A method according to claim 1 wherein fine undulations are provided on at least a portion of the surface of at least one paddle.

* * * * *